US008948056B2

(12) United States Patent
Lei et al.

(10) Patent No.: US 8,948,056 B2
(45) Date of Patent: Feb. 3, 2015

(54) SPANNING-TREE BASED LOOP DETECTION FOR AN ETHERNET FABRIC SWITCH

(75) Inventors: Tse Yu Lei, San Jose, CA (US); Ning Song, Milpitas, CA (US); Vardarajan Venkatesh, Santa Clara, CA (US); Mythilikanth Raman, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 0 days.

(21) Appl. No.: 13/533,843

(22) Filed: Jun. 26, 2012

(65) Prior Publication Data

US 2013/0003608 A1 Jan. 3, 2013

Related U.S. Application Data

(60) Provisional application No. 61/502,115, filed on Jun. 28, 2011.

(51) Int. Cl.
*H04L 12/28* (2006.01)

(52) U.S. Cl.
USPC .......................... 370/256; 370/392; 370/400

(58) Field of Classification Search
USPC .................................. 370/256, 392, 393, 400
See application file for complete search history.

(56) References Cited

U.S. PATENT DOCUMENTS

| 5,390,173 | A | 2/1995 | Spinney |
| 5,802,278 | A | 9/1998 | Isfeld |
| 5,983,278 | A | 11/1999 | Chong |
| 6,041,042 | A | 3/2000 | Bussiere |
| 6,085,238 | A | 7/2000 | Yuasa |
| 6,104,696 | A | 8/2000 | Kadambi |
| 6,185,241 | B1 | 2/2001 | Sun |
| 6,438,106 | B1 | 8/2002 | Pillar |
| 6,542,266 | B1 | 4/2003 | Phillips |
| 6,633,761 | B1 | 10/2003 | Singhal |
| 6,873,602 | B1 | 3/2005 | Ambe |
| 6,975,581 | B1 | 12/2005 | Medina |
| 6,975,864 | B2 | 12/2005 | Singhal |
| 7,016,352 | B1 | 3/2006 | Chow |
| 7,173,934 | B2 | 2/2007 | Lapuh |
| 7,197,308 | B2 | 3/2007 | Singhal |

(Continued)

FOREIGN PATENT DOCUMENTS

| CN | 102801599 | 11/2012 |
| EP | 1916807 A2 | 4/2008 |

(Continued)

OTHER PUBLICATIONS

"Switched Virtual Internetworking moves beyond bridges and routers", Sep. 23, 1994, No. 12, New York, US.

(Continued)

*Primary Examiner* — Andrew Lee
(74) *Attorney, Agent, or Firm* — Shun Yao; Park, Vaughan, Fleming & Dowler LLP

(57) ABSTRACT

One embodiment of the present invention provides a switch. The switch includes a local database, a packet processor, a data management module, and a tree construction module. The packet processor extracts spanning tree information associated with a remote switch. The data management module stores the extracted spanning tree information in the local database. The tree construction module assigns an interface state associated with a spanning tree to a local interface based on the extracted spanning tree information.

26 Claims, 13 Drawing Sheets

(56) References Cited

U.S. PATENT DOCUMENTS

| | | |
|---|---|---|
| 7,206,288 B2 | 4/2007 | Cometto |
| 7,310,664 B1 | 12/2007 | Merchant |
| 7,313,637 B2 | 12/2007 | Tanaka |
| 7,330,897 B2 | 2/2008 | Baldwin |
| 7,380,025 B1 | 5/2008 | Riggins |
| 7,453,888 B2 | 11/2008 | Zabihi |
| 7,477,894 B1 | 1/2009 | Sinha |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,960 B1 | 3/2010 | Aubuchon |
| 7,690,040 B2 | 3/2010 | Frattura |
| 7,716,370 B1 | 5/2010 | Devarapalli |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri et al. |
| 7,836,332 B2 | 11/2010 | Hara |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,068,442 B1 * | 11/2011 | Kompella ............... 370/256 |
| 8,078,704 B2 | 12/2011 | Lee |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,301,686 B1 | 10/2012 | Appajodu |
| 8,351,352 B1 | 1/2013 | Eastlake, III |
| 8,369,347 B2 | 2/2013 | Xiong |
| 8,392,496 B2 | 3/2013 | Linden |
| 8,462,774 B2 | 6/2013 | Page |
| 8,520,595 B2 | 8/2013 | Yadav |
| 8,599,850 B2 | 12/2013 | Jha |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0189905 A1 | 10/2003 | Lee |
| 2004/0001433 A1 | 1/2004 | Gram |
| 2004/0010600 A1 | 1/2004 | Baldwin |
| 2004/0117508 A1 | 6/2004 | Shimizu |
| 2004/0120326 A1 | 6/2004 | Yoon |
| 2004/0165595 A1 | 8/2004 | Holmgren |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0169188 A1 | 8/2005 | Cometto |
| 2005/0195813 A1 | 9/2005 | Ambe |
| 2005/0213561 A1 | 9/2005 | Yao |
| 2005/0265356 A1 | 12/2005 | Kawarai |
| 2005/0278565 A1 | 12/2005 | Frattura |
| 2006/0018302 A1 | 1/2006 | Ivaldi |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0251067 A1 | 11/2006 | DeSanti |
| 2006/0256767 A1 | 11/2006 | Suzuki |
| 2006/0265515 A1 | 11/2006 | Shiga |
| 2007/0036178 A1 | 2/2007 | Hares |
| 2007/0097968 A1 | 5/2007 | Du |
| 2007/0116224 A1 | 5/2007 | Burke |
| 2007/0177597 A1 | 8/2007 | Ju |
| 2007/0274234 A1 | 11/2007 | Kubota |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0267179 A1 | 10/2008 | LaVigne |
| 2008/0285555 A1 | 11/2008 | Ogasahara |
| 2008/0298248 A1 | 12/2008 | Roeck |
| 2009/0037607 A1 | 2/2009 | Farinacci |
| 2009/0044270 A1 | 2/2009 | Shelly |
| 2009/0067422 A1 | 3/2009 | Poppe |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0106405 A1 | 4/2009 | Mazarick |
| 2009/0138752 A1 | 5/2009 | Graham |
| 2009/0168647 A1 * | 7/2009 | Holness et al. ............... 370/228 |
| 2009/0199177 A1 | 8/2009 | Edwards |
| 2009/0204965 A1 | 8/2009 | Tanaka |
| 2009/0213783 A1 * | 8/2009 | Moreton ............... 370/328 |
| 2009/0222879 A1 | 9/2009 | Kostal |
| 2009/0245137 A1 | 10/2009 | Hares |
| 2009/0245242 A1 | 10/2009 | Carlson |
| 2009/0260083 A1 | 10/2009 | Szeto |
| 2009/0323708 A1 | 12/2009 | Ihle |
| 2009/0327392 A1 | 12/2009 | Tripathi |
| 2009/0327462 A1 | 12/2009 | Adams |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0169467 A1 | 7/2010 | Shukla |
| 2010/0169948 A1 | 7/2010 | Budko |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035498 A1 | 2/2011 | Shah |

(56) References Cited

U.S. PATENT DOCUMENTS

| | | | |
|---|---|---|---|
| 2011/0044339 A1 | 2/2011 | Kotalwar | |
| 2011/0064086 A1 | 3/2011 | Xiong | |
| 2011/0072208 A1 | 3/2011 | Gulati | |
| 2011/0085560 A1 | 4/2011 | Chawla | |
| 2011/0085563 A1 | 4/2011 | Kotha | |
| 2011/0134802 A1* | 6/2011 | Rajagopalan et al. | 370/256 |
| 2011/0134803 A1* | 6/2011 | Dalvi et al. | 370/256 |
| 2011/0134925 A1 | 6/2011 | Safrai | |
| 2011/0142053 A1 | 6/2011 | Van Der Merwe | |
| 2011/0142062 A1 | 6/2011 | Wang | |
| 2011/0161695 A1 | 6/2011 | Okita | |
| 2011/0194403 A1 | 8/2011 | Sajassi | |
| 2011/0194563 A1 | 8/2011 | Shen | |
| 2011/0228780 A1 | 9/2011 | Ashwood-Smith | |
| 2011/0231574 A1 | 9/2011 | Saunderson | |
| 2011/0235523 A1 | 9/2011 | Jha | |
| 2011/0243133 A9 | 10/2011 | Villait | |
| 2011/0243136 A1 | 10/2011 | Raman | |
| 2011/0246669 A1 | 10/2011 | Kanada | |
| 2011/0255538 A1 | 10/2011 | Srinivasan | |
| 2011/0255540 A1 | 10/2011 | Mizrahi | |
| 2011/0261828 A1 | 10/2011 | Smith | |
| 2011/0268120 A1 | 11/2011 | Vobbilisetty | |
| 2011/0274114 A1 | 11/2011 | Dhar | |
| 2011/0286457 A1 | 11/2011 | Ee | |
| 2011/0296052 A1 | 12/2011 | Guo | |
| 2011/0299391 A1 | 12/2011 | Vobbilisetty | |
| 2011/0299414 A1 | 12/2011 | Yu | |
| 2011/0299527 A1 | 12/2011 | Yu | |
| 2011/0299528 A1 | 12/2011 | Yu | |
| 2011/0299531 A1 | 12/2011 | Yu | |
| 2011/0299532 A1 | 12/2011 | Yu | |
| 2011/0299533 A1 | 12/2011 | Yu | |
| 2011/0299536 A1 | 12/2011 | Cheng | |
| 2012/0011240 A1 | 1/2012 | Hara | |
| 2012/0014261 A1 | 1/2012 | Salam | |
| 2012/0014387 A1 | 1/2012 | Dunbar | |
| 2012/0027017 A1 | 2/2012 | Rai | |
| 2012/0033663 A1 | 2/2012 | Guichard | |
| 2012/0033665 A1 | 2/2012 | Jacob Da Silva et al. | |
| 2012/0099602 A1 | 4/2012 | Nagapudi | |
| 2012/0106339 A1 | 5/2012 | Mishra | |
| 2012/0131097 A1 | 5/2012 | Baykal | |
| 2012/0131289 A1 | 5/2012 | Taguchi | |
| 2012/0163164 A1 | 6/2012 | Terry | |
| 2012/0243539 A1 | 9/2012 | Keesara | |
| 2012/0275347 A1* | 11/2012 | Banerjee et al. | 370/256 |
| 2012/0294194 A1* | 11/2012 | Balasubramanian | 370/256 |
| 2012/0320800 A1 | 12/2012 | Kamble | |
| 2013/0127848 A1* | 5/2013 | Joshi et al. | 345/420 |
| 2013/0250951 A1* | 9/2013 | Koganti | 370/390 |
| 2013/0259037 A1 | 10/2013 | Natarajan | |

FOREIGN PATENT DOCUMENTS

| | | |
|---|---|---|
| EP | 2001167 A1 | 12/2008 |
| WO | 2010111142 A1 | 9/2010 |

OTHER PUBLICATIONS

Knight, S. et al. "Virtual Router Redundancy Protocol", Apr. 1998, XP-002135272.

Eastlake, Donald et al., "RBridges: TRILL Header Options", Dec. 2009.

Touch, J. et al., "Transparent Interconnection of Lots of Links (TRILL): Problem and Applicability Statement", May 2009.

Perlman, Radia et al., "RBridge VLAN Mapping", Dec. 2009.

"Brocade Fabric OS (FOS) 6.2 Virtual Fabrics Feature Frequently Asked Questions".

Perlman, Radia "Challenges and Opportunities in the Design of TRILL: a Routed layer 2 Technology", XP-002649647, 2009.

Nadas, S. et al., "Virtual Router Redundancy Protocol (VRRP) Version 3 for IPv4 and IPv6", Mar. 2010.

Perlman, Radia et al., "RBridges: Base Protocol Specification", Mar. 2010.

Christensen, M. et al., "Considerations for Internet Group Management Protocol (IGMP) and Multicast Listener Discovery (MLD) Snooping Switches", May 2006.

"Switched Virtual Internetworking moved beyond bridges and routers", 8178 Data Communications Sep. 23, 1994, No. 12, New York.

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

Perlman, Radia et al., "RBridges: Base Protocol Specification", draft-ietf-trill-rbridge-protocol-16.txt, Mar. 3, 2010.

Lapuh, Roger et al., "Split Multi-link Trunking (SMLT)", Oct. 2002.

Lapuh, Roger et al., "Split Multi-link Trunking (SMLT) draft-lapuh-network-smlt-08", 2008.

Office Action for U.S. Appl. No. 13/533,843, filed Jun. 26, 2012, dated Oct. 21, 2013.

Office Action for U.S. Appl. No. 13/351,513, filed Jan. 17, 2012, dated Feb. 28, 2014.

Office Action for U.S. Appl. No. 13/425,238, filed Mar. 20, 2012, dated Mar. 6, 2014.

Office Action for U.S. Appl. No. 13/312,903, filed Dec. 6, 2011, dated Nov. 12, 2013.

Office Action for U.S. Appl. No. 13/092,873, filed Apr. 22, 2011, dated Nov. 29, 2013.

Office Action for U.S. Appl. No. 13/194,526, filed Jul. 16, 2011, dated Dec. 2, 2013.

Office Action for U.S. Appl. No. 13/092,460, filed Apr. 22, 2011, dated Mar. 14, 2014.

Office Action for U.S. Appl. No. 13/042,259, filed Mar. 7, 2011, dated Jan. 16, 2014.

Office Action for U.S. Appl. No. 13/092,580, filed Apr. 22, 2011, dated Jan. 10, 2014.

Office Action for U.S. Appl. No. 13/092,877, filed Apr. 22, 2011, dated Jan. 6, 2014.

Office Action for U.S. Appl. No. 13/598,204, filed Aug. 29, 2012, dated Feb. 20, 2014.

Office Action for U.S. Appl. No. 13/092,752, filed Apr. 22, 2011, dated Apr. 9, 2014.

Office Action for U.S. Appl. No. 13/092,701, filed Apr. 22, 2011, dated Mar. 26, 2014.

Office Action for U.S. Appl. No. 13/092,724, filed Apr. 22, 2011, dated Apr. 9, 2014.

Office Action for U.S. Appl. No. 13/098,490, filed May 2, 2011, dated Mar. 27, 2014.

Louati, Wajdi et al., "Network-Based Virtual Personal Overlay Networks Using Programmable Virtual Routers", 2005.

Knight, Paul et al., "Network based IP VPN Architecture using Virtual Routers", May 2003.

Kreeger, L. et al. "Network Virtualization Overlay Control Protocol Requirements draft-kreeger-nvo3-overlay-cp-00", Aug. 2, 2012.

An Introduction to Brocade VCS Fabric Technology, Dec. 3, 2012.

Knight, Paul et al. "Layer 2 and 3 Virtual Private Networks: Taxonomy, Technology, and Standardization Efforts", 2004.

Narten, T. et al. "Problem Statement: Overlays for Network Virtualization draft-narten-nvo3-overlay-problem-statement-01", Oct. 31, 2011.

The Effortless Network: HyperEdge Technology for the Campus LAN, 2012.

FastIron and Turbulron 24x Configuration Guide, 2010.

FastIron Configuration Guide, Supporting IronWare Software Release 07.0.00, 2009.

Foundary FastIron Configuration Guide, Software Release FSX 04.2.00b, Software Release FWS 04.3.00, Software Release FGS 05.0.00a, 2008.

Brocade Unveils "The Effortless Network", 2009.

(56) References Cited

OTHER PUBLICATIONS

Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated Dec. 5, 2012.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Feb. 3, 2012, dated Jul. 18, 2013.
Office Action for U.S. Appl. No. 13/312,903, filed Dec. 6, 2011, dated Jun. 13, 2013.

* cited by examiner

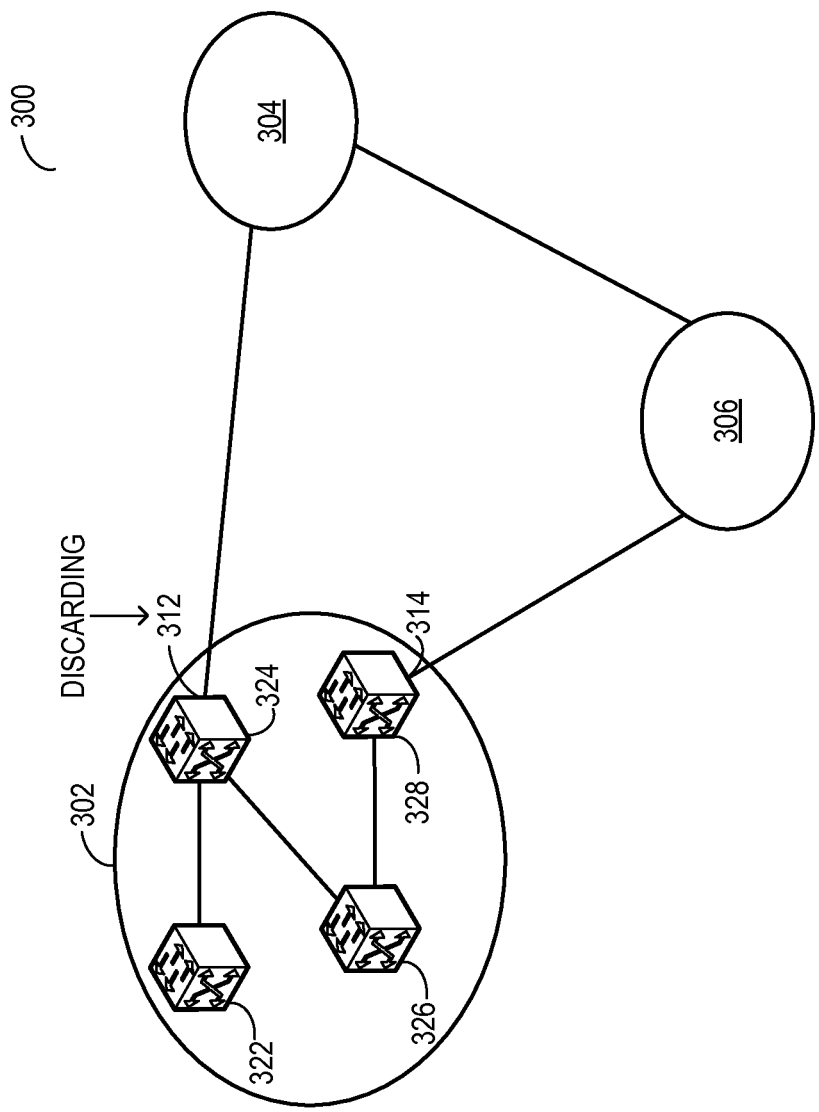

SPANNING-TREE BASED LOOP DETECTION FOR AN ETHERNET FABRIC SWITCH

RELATED APPLICATIONS

This application claims the benefit of U.S. Provisional Application No. 61/502,115, titled "Spanning Tree Based Loop Detection over Ethernet Fabrics/VCS Networks," by inventors Jerry Lei, Ning Song, Venky Venkatesh, Mythilikanth Raman, and Ram Singh, filed 28 Jun. 2011, the disclosure of which is incorporated by reference herein.

The present disclosure is related to U.S. Patent Application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

1. Field

The present disclosure relates to network management. More specifically, the present disclosure relates to a method and system for efficiently detecting a loop in a layer-2 fabric switch.

2. Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

One way to increase the throughput of a switch system is to use switch stacking. In switch stacking, multiple smaller-scale, identical switches are interconnected in a special pattern to form a larger fabric switch. The amount of required manual configuration and topological limitations for switch stacking becomes prohibitively tedious when the stack reaches a certain size, which precludes switch stacking from being a practical option in building a large-scale switching system.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While fabric switches brings many desirable features to layer-2 networks, some issues remain unsolved in loop detection.

SUMMARY

One embodiment of the present invention provides a switch. The switch includes a local database, a packet processor, a data management module, and a tree construction module. The packet processor extracts spanning tree information associated with a remote switch. The data management module stores the extracted spanning tree information in the local database. The tree construction module assigns an interface state associated with a spanning tree to a local interface based on the extracted spanning tree information.

In a variation on this embodiment, the spanning tree information is associated with one or more of the following protocols: 1) Spanning Tree Protocol (STP); 2) Rapid Spanning Tree Protocol (RSTP); and 3) Multiple Spanning Tree Protocol (MSTP).

In a variation on this embodiment, the packet processor extracts updated spanning tree information associated with the remote switch; the data management module determines difference between the spanning tree information in the local database and the updated spanning tree information; and the packet processor constructs a frame containing the information difference for the remote switch.

In a variation on this embodiment, the packet processor extracts spanning tree state synchronization information associated with the remote switch from a received frame; and the tree construction module assigns the interface state based on the spanning tree state synchronization information.

In a variation on this embodiment, the tree construction module precludes the local interface from forwarding frames based on the assigned interface state.

In a variation on this embodiment, the tree construction module identifies the local interface based on an interface identifier, wherein the interface identifier is unique in the switch and the remote switch.

In a variation on this embodiment, the switch and the remote switch are members of an Ethernet fabric switch; and the switch and the remote switch are associated with an identifier of the Ethernet fabric switch.

In a variation on this embodiment, the tree construction module assigns the interface state on a per virtual local area network (VLAN) basis.

In a further variation on this embodiment, the tree construction module consolidates interface states associated with a plurality of VLANs into a single interface state.

In a variation on this embodiment, the packet processor extracts frames encapsulated in a Transparent Interconnection of Lots of Links (TRILL) header.

BRIEF DESCRIPTION OF THE FIGURES

FIG. 3A illustrates an exemplary fabric switch which can split while breaking a loop, in accordance with an embodiment of the present invention.

DETAILED DESCRIPTION

Figure 1:
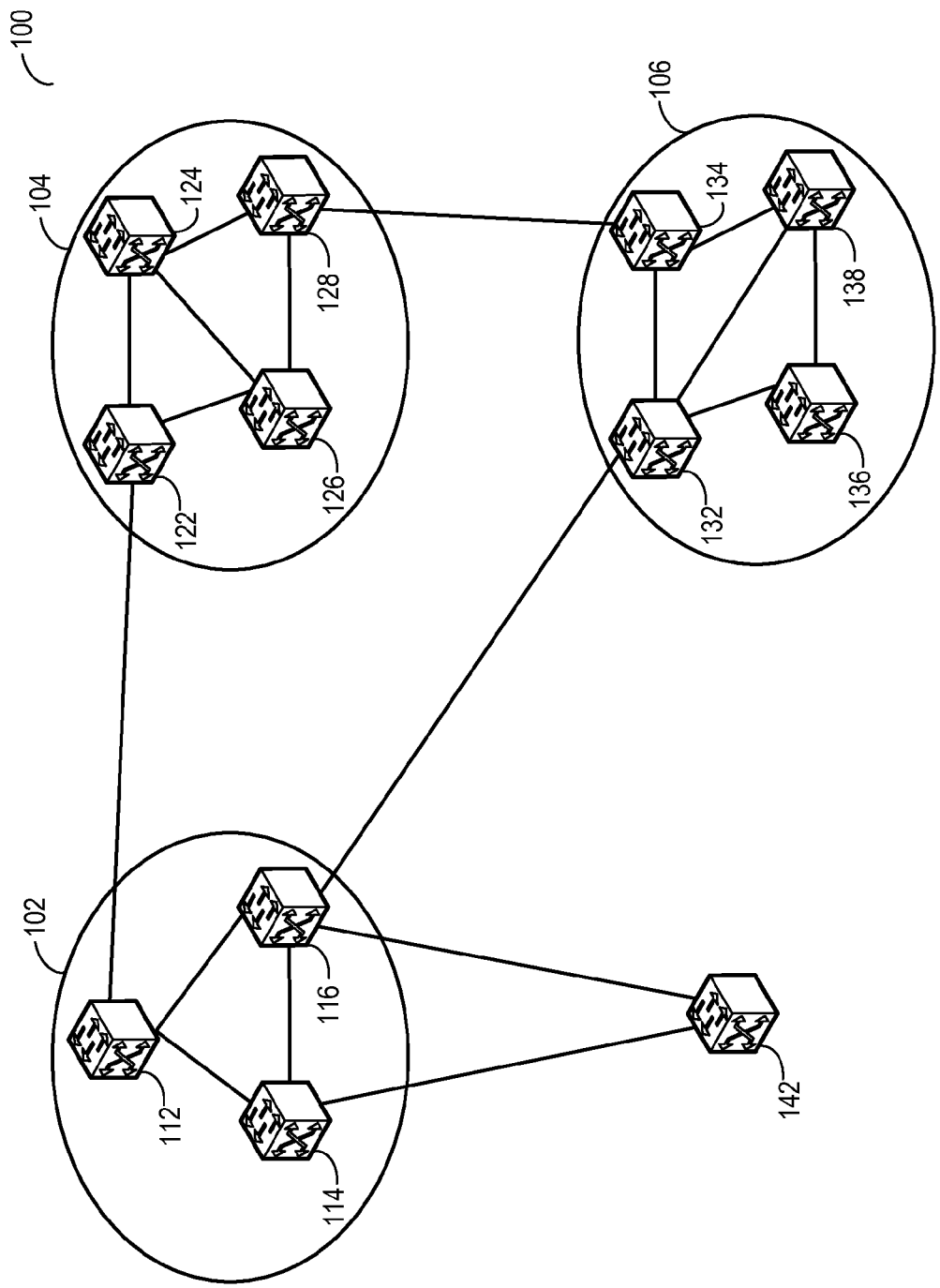
FIG. 1 illustrates detecting and breaking loops in an exemplary layer-2 network, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and appli-cations without departing from the spirit and scope of the present invention. Thus, the present invention is not limited to the embodiments shown, but is to be accorded the widest scope consistent with the claims.

Overview

In embodiments of the present invention, the problem of a fabric switch detecting and breaking loops is solved by sharing Spanning Tree Protocol (STP) state information among the member switches of the fabric switch. Fabric switches are typically coupled to a network based on layer-2 and/or layer-3 protocols. Designing and provisioning a layer-3 network (e.g., an IP network) is complex because a respective layer-3 networking device (e.g., a router) requires individual configurations, such as address assignment for a respective interface in the device, and routing protocol selection and configuration. For a large and dynamic network, in which the network topology often changes due to addition of new networking devices, new links, new services, etc., configuring individual networking devices can be complex and tedious. Consequently, plug-and-play services are difficult to incorporate in such a network. On the other hand, a layer-2 network (e.g., an Ethernet network) can more readily facilitate plug-and-play services. A typical layer-2 switching protocol does not require complex configurations. Because a respective interface on a layer-2 switch has a default layer-2 network address (e.g., a media access control (MAC) address), the interface does not require any address configuration. Furthermore, layer-2 switching does not rewrite the layer-2 header of a packet, resulting in a lighter load on hardware and a better performance.

However, when three or more switches are coupled in a layer-2 network, there can be layer-2 loops (i.e., loops created by external connectivity of a switch) between these switches. Typically a layer-2 network can have unicast, multicast, and broadcast frames. A switch transmits a broadcast or multicast frame via multiple interfaces except the receiving interface. In addition, the switch forwards a unicast frame with an unknown destination address via multiple interfaces (referred to as flooding) except the receiving interface, to ensure that the frame reaches the destination. When such a frame reaches a second switch, the second switch repeats the same. If there is a loop in the network, the frame traverses through multiple switches along the loop and eventually returns back to the originating switch. The switch repeats the action again and the frame continues to circulate the network in a loop. This results in a broadcast storm of data traffic in the layer-2 domain.

To solve this problem, the member switches of a fabric switch can locally run an STP instance and receive information about other member switches. STP is described in Institute of Electrical and Electronics Engineers (IEEE) Standard IEEE 802.1D "Media Access Control (MAC) Bridges," which is incorporated by reference herein. To prevent loops in a layer-2 network, STP creates a spanning tree in the network by logically eliminating all other links in the network. During operation, one switch in the network is elected as the root switch of the spanning tree. All other switches in the network elect a local interface (can be referred to as a root interface) that has a least cost path to the root switch. Furthermore, the switches in a respective network segment collectively determine which switch has the least-cost path from the network segment to the root switch. The interface connecting this switch to the network segment is assigned as the designated interface for the segment. A respective switch in the network receives and forwards traffic only via the root or designated interfaces and transitions all other inter-switch interfaces (i.e., the interfaces connecting to other switches in the network) to a discarding state. An interface does not forward frames or learn MAC address in the discarding state. In this way, a loop-free spanning tree from the root switch is created in the network.

In some embodiments, a fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the STP instances running in the network. Consequently, the member switches of a fabric switch run STP instances in conjunction with each other and STP instances running on all external switches considers all member switches as a single STP switch. A respective member switch can share local STP state information with all other member switches to run STP instances in conjunction with each other.

Although the present disclosure is presented using examples based on the layer-2 communication protocol, embodiments of the present invention are not limited to layer-2 networks. Embodiments of the present invention are relevant to any networking protocol which requires a loop-free network topology. In this disclosure, the term "layer-2 network" is used in a generic sense, and can refer to any networking layer, sub-layer, or a combination of networking layers below layer-3 (e.g., the network layer in the Internet protocol stack).

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional layer-2 switch, or any other type of network device. Additionally, an end device can be coupled to other switches or hosts further away from a layer-2 network. An end device can also be an aggregation point for a number of network devices to enter the layer-2 network.

The terms "interface" and "port" are used interchangeably. The term "edge interface" refers to an interface on a fabric switch which exchanges data frames with a network device outside of the fabric switch (i.e., an edge interface is not used for exchanging data frames with another member switch of a fabric switch). In a generic sense, the term "interface" can refer to any interface of a switch, including an "edge interface." The term "internal interface" refers to an interface which sends/receives data frames within a fabric switch. An "internal interface" can send/receive data frames encapsulated with a TRILL header and outer MAC header.

The term "switch identifier" refers to a group of bits that can be used to identify a switch. If a switch is an RBridge, the switch identifier can be referred to as an "RBridge identifier." Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term and is not limited to any bit format, and can refer to any format that can identify a switch. The term "RBridge identifier" is also used in a generic sense and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "loop" is used in a generic sense, and it can refer to any number of standalone and fabric switches coupled to each other in such a way that at least one of the switches may receive a frame previously originated from the same switch. The term "loop breaking" refers to disabling an interface or a link between two switches belonging to a loop in so that the loop does not exist any longer.

The term "STP" is used in a generic sense, and it can refer to any protocol that creates a spanning tree in a network. Such a protocol can be distributed or centralized. Examples of such protocol include, but not limited to, Rapid Spanning Tree Protocol (RSTP) and Multiple Spanning Tree Protocol (MSTP).

The term "Ethernet fabric switch" or "VCS" refers to a number of interconnected physical switches which form a single, scalable logical switch. In a fabric switch, any number of switches can be connected in an arbitrary topology and the entire group of switches functions together as one single, logical switch. This feature makes it possible to use many smaller, inexpensive switches to construct a large fabric switch, which can be viewed as a single logical switch externally.

Network Architecture

FIG. 1 illustrates loop detection in an exemplary network, in accordance with an embodiment of the present invention. As illustrated in FIG. 1, fabric switches 102, 104, and 106, and standalone switch 142 are coupled to each other in a layer-2 network 100 (e.g. Ethernet). In some embodiments, switch 142 can operate as a fabric switch by itself. Fabric switch 102 includes member switches 112, 114, and 116. Similarly, fabric switch 104 includes member switches 122, 124, 126, and 128, and fabric switch 106 includes switches member 132, 134, 136, and 138. In some embodiments, all member switches of fabric switches 102, 104, and 106 are RBridges and coupled to each other within the fabric switch via TRILL protocol. In this example, fabric switches 102, 104, and 106 are coupled to each other in a ring topology. Standalone switch 142 is coupled to switches 114 and 116 of fabric switch 102.

To detect and break a loop in network 100, an STP instance of a respective switch locally computes a network-wide spanning tree. In some embodiments, one member switch of a fabric switch is elected as the master switch which runs the STP instance for the fabric switch and maintains an STP database containing STP information about all member switches. For example, in FIG. 1, switch 112 can be the master switch for fabric switch 102, and switches 114 and 116 forward the received BPDU to switch 112. In some embodiments, a respective switch in fabric switch 102 maintains a local STP database and the master switch runs the STP instance. In some further embodiments, a respective member switch of fabric switch 102 runs an STP instance and the master switch maintains the STP database. However, a single failure to switch 112 can cause a change in the topology of fabric switch 102 leading to synchronization overhead and reduced scalability. To address this issue, in some embodiments, a respective member switch of a fabric switch runs an STP instance and maintains an STP database. In this distributed approach, STP instances of the member switches share STP state information and stores the local and received STP information in the local STP database. Such implementation provides high availability and increases scalability of the fabric switch.

During operation, a switch identifier (can be referred to as a bridge identifier) is assigned to a respective switch in network 100. For a fabric switch, the switch identifier can be the MAC address of one of the member switches. All member switches of the fabric switch share the same switch identifier. For example, the switch identifier of a VCS can be the MAC address of the root switch of the VCS multicast distribution tree. In this example, identifier of fabric switches 102, 104, and 106 can be the MAC addresses of member switches 112, 122, and 132, respectively. One of the switches in network 100, such as fabric switch 102, is then elected as the root switch (can also be referred to as the root bridge) of the spanning tree as specified in the STP standard. The root switch can be selected based on a switch priority value, which can be the switch identifier. In some embodiments, the switch identifier with the lowest value is elected as the root switch. A respective interface of a fabric switch has an identifier which uniquely identifies the interface across the fabric switch. In some embodiments, the interface identifier can be a combination of a member switch identifier and an interface index. For example, an interface of switch 126 can be identified by an identifier to switch 126 and an interface index specific to switch 126.

An STP instance runs locally on a respective member switch of fabric switch 102 but as one STP switch across fabric switch 102. During operation, a respective member switch of fabric switch 102 receives STP information from received Bridge Protocol Data Units (BPDUs) via both edge and internal interfaces. All member switches of fabric switch 102 become aware of being the root switch and sends BPDUs via edge interfaces, as specified in the STP standard. For example, switch 122 of fabric switch 104 receives a BPDU from switch 112 of root switch 102. Switch 122 then distributes the BPDU to switches 124, 126, and 128 via logical internal links of fabric switch 104. Such logical links can be zero-cost links. Fabric switch 104 receives a second BPDU via switch 128 through fabric switch 106. Switch 128 distributes the second BPDU to all other member switches as well. Because all switches of fabric switch 104 shares the same identifier, the STP instance of switch 122 perceives that fabric switch 102 has received two BPDUs. The STP instance of switch 122 detects that the BPDU received via switch 122 has a better path cost and stores this superior BPDU information in a local STP database. The STP instance of switch 122 then keeps the interface active and recognizes the other interface to be in a different member switch from the corresponding interface identifier. Consequently, the STP instance of switch 122 does not take any action for this interface.

On the other hand, the STP instance of switch 128 also detects that the BPDU received via switch 122 has better path cost. The STP instance of switch 128 then recognizes the other interface to be a local interface. Consequently, switch 128 transitions the interface from which the second BPDU has been received to a discarding state. Switch 142 receives two BPDUs from switches 114 and 116 with the same path cost. Switch 142 can use a priority value associated with an interface to break the tie and transitions the interface with lower priority to a discarding state. In some embodiments, the priority can be derived from the MAC address of the interface.

Figure 2:
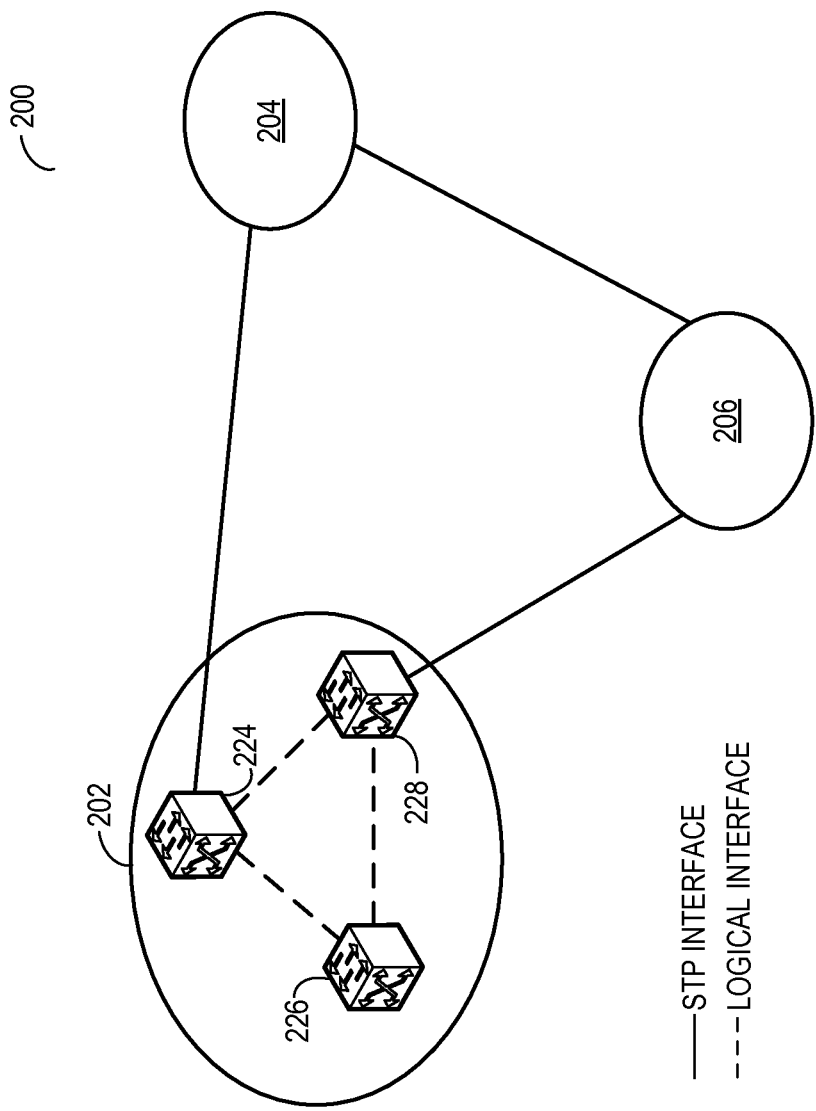
FIG. 2 illustrates exemplary STP and logical interfaces of a fabric switch, in accordance with an embodiment of the present invention.

Note that the loop detection for a fabric switch is relevant to edge interfaces (i.e., the interfaces connecting end devices and other non-member switches). These interfaces can be referred to as STP interfaces. On the other hand, the internal interfaces (i.e., the interfaces connecting member switches) appear as logical interfaces to the STP instances and ensure that the STP instances do not consider these internal interfaces while breaking loops. At the same time, these logical links allow member switches of a fabric switch to share BPDU among themselves. FIG. 2 illustrates exemplary STP and logical interfaces of a fabric switch, in accordance with an embodiment of the present invention. In this example, switches 202, 204, and 206 are coupled to each other in a layer-2 network 200. Switch 202 is a fabric switch with member switches 224, 226, and 228. Switches 204 and 206 can be fabric or standalone switches.

The STP instance of member switch 224 considers the interface coupling switch 204 as an STP interface because the loop-breaking is required for the interface. On the other hand, the STP instance of switch 224 considers the interfaces coupling other member switches 226 and 228 as logical zero-cost interfaces. During operation, switch 224 receives a BPDU from switch 204 and distributes the BPDU to all other switches via the logical interfaces. As a result, the same STP information is received at a respective switch in fabric switch 202 without any additional path cost within fabric switch 202. In this way, any member switch of a fabric switch can compare all BPDUs received by the fabric switch.

Topology Chances

A fabric switch can split due to node or link failures within the fabric switch and can form a new fabric switch. This new fabric switch can be represented as a single STP switch with a new unique switch identifier. The member switches of the new fabric switch can participate in STP immediately to ensure a loop-free changed topology. FIG. 3A illustrates an exemplary fabric switch which can split while breaking a loop, in accordance with an embodiment of the present invention. Switches 302, 304, and 306 are coupled to each other in a layer-2 network 300. Switch 302 is a fabric switch with member switches 322, 324, 326, and 328. Switches 304 and 306 can be fabric or standalone switches. Switch 324 is coupled to switch 304 via interface 312, and switch 328 is coupled to switch 306 via interface 314 in a ring topology. During operation, the STP instance of switch 324 transitions interface 312 to a discarding state while the STP instance of switch 328 keeps interface 312 in a forwarding state, as described in conjunction with FIG. 1.

Figure 3B:
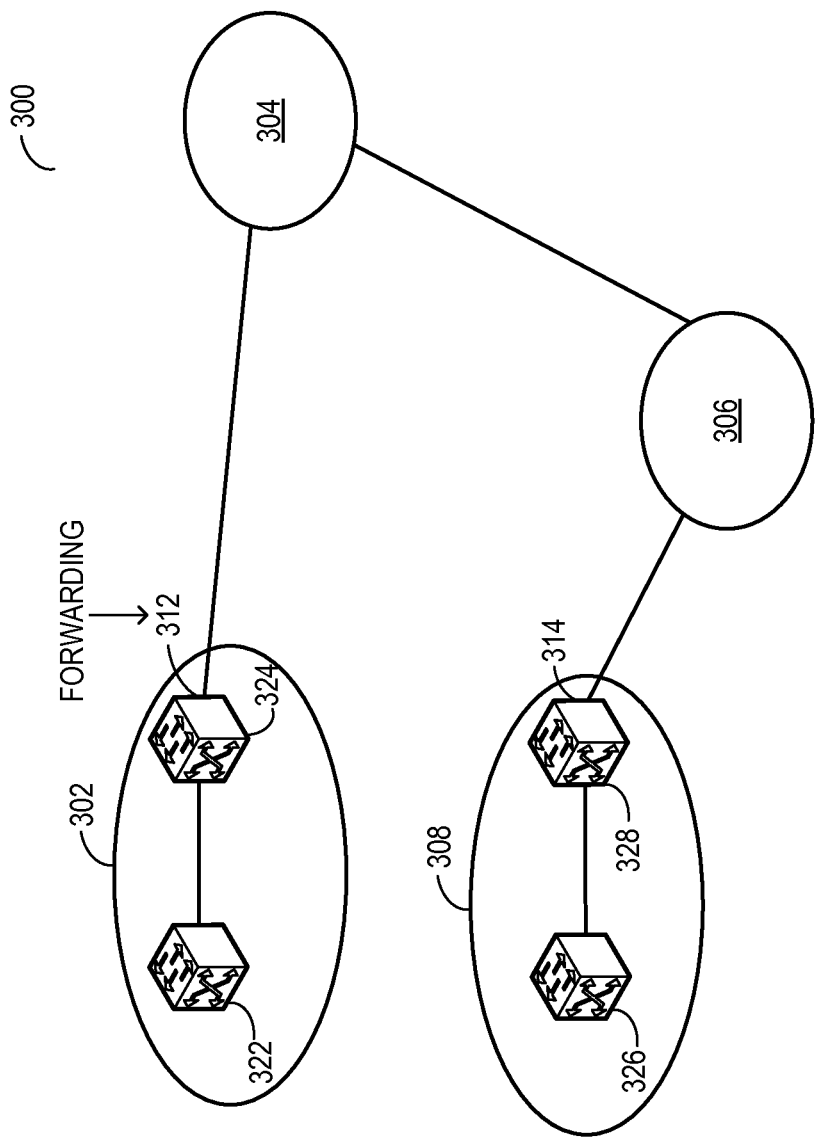
FIG. 3B illustrates a fabric switch splitting while breaking a loop, in accordance with an embodiment of the present invention.

Fabric switch 302 can split due to node or link failures. FIG. 3B illustrates a fabric switch splitting while breaking a loop, in accordance with an embodiment of the present invention. All components in FIG. 3B are the same as in FIG. 3A, so the same numerals are used to denote them. Suppose that the link coupling switches 324 and 326 fails. As a result, switches 322 and 324 remain in fabric switch 302 while switches 326 and 328 form a new fabric switch 308. Fabric switch 308 becomes a new STP switch with a new unique switch identifier. The STP instances in switches 326 and 328 start operating with the new identifier and can participate in STP immediately to ensure a loop-free topology. In this new topology, interface 312 is no longer in a loop. Hence, the STP instance of switch 324 transitions interface 312 to a forwarding state.

Figure 4A:
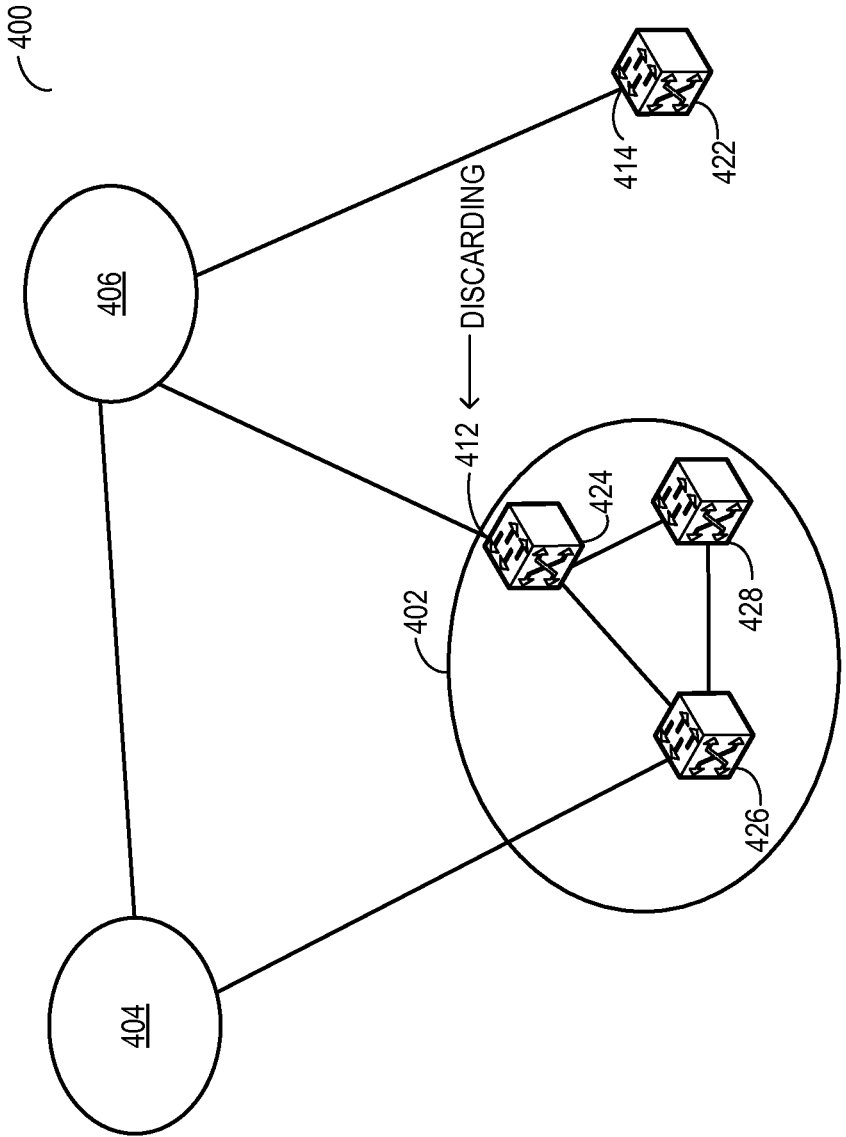
FIG. 4A illustrates an exemplary fabric switch which can accept more member switches while breaking a loop, in accordance with an embodiment of the present invention.

Another topology change can be a switch merging with an existing fabric switch. Upon joining the fabric switch, a new member switch joins the internal fabric protocol and become part of the fabric switch. The STP instance of the fabric switch (i.e., with the fabric switch identifier) runs on this new switch. FIG. 4A illustrates an exemplary fabric switch which can accept more member switches while breaking a loop, in accordance with an embodiment of the present invention. Switches 402, 404, 406, and 422 are coupled to each other in a layer-2 network 400. Switch 402 is a fabric switch with member switches 424, 426, and 428. Switches 404 and 406 can be fabric or standalone switches. Switch 422 is a standalone switch. Switches 422 and 424 are coupled to switch 406 via interfaces 414 and 412, respectively. During operation, the STP instance of switch 424 transitions interface 412 to a discarding state, as described in conjunction with FIG. 1.

Figure 4B:
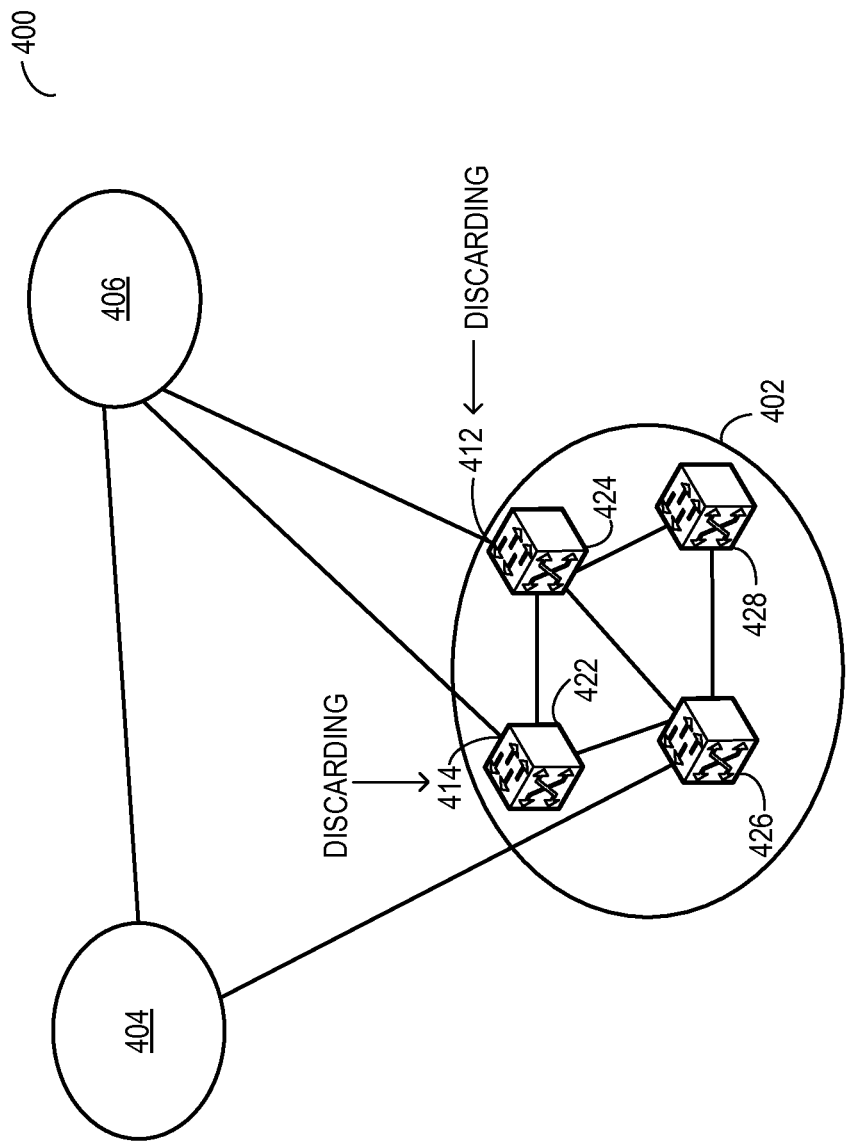
FIG. 4B illustrates a switch merging with a fabric switch while breaking a loop, in accordance with an embodiment of the present invention.

FIG. 4B illustrates a switch merging with a fabric switch while breaking a loop, in accordance with an embodiment of the present invention. All components in FIG. 4B are the same as in FIG. 4A, so the same numerals are used to denote them. During operation, switch 404 is elected as the root switch in network 400. Switch 422 joins existing fabric switch 402 and is coupled to member switches 424 and 426. Switch 422 joins the fabric protocol running in fabric switch 402 and become a part of fabric switch 402. The STP instance of fabric switch 402 then runs on switch 422 and uses the switch identifier of fabric switch 402. The STP information (e.g., edge interface information) of switch 422 is included in the databases of all other member switches. Because fabric switch 402 already has a superior root interface via switch 426, the STP instance on switch 414 transitions interface 414 to a discarding state.

If one edge interface of a switch (e.g., switch 426) is activated, the STP instance of switch 426 treats the interface as a new STP interface. Other member switches may not receive information about this new edge interface. On the other hand, when an edge interface is deactivated, the interface is treated as a STP interface shutdown. If other member switches have received superior BPDU from this interface, all other member switches retire the superior BPDU information. Other member switches can retire the superior BPDU information by receiving superior BPDU from another port or by aging out the corresponding BPDU information from the local STP database, as specified in the STP standard.

STP Process

Figure 5A:
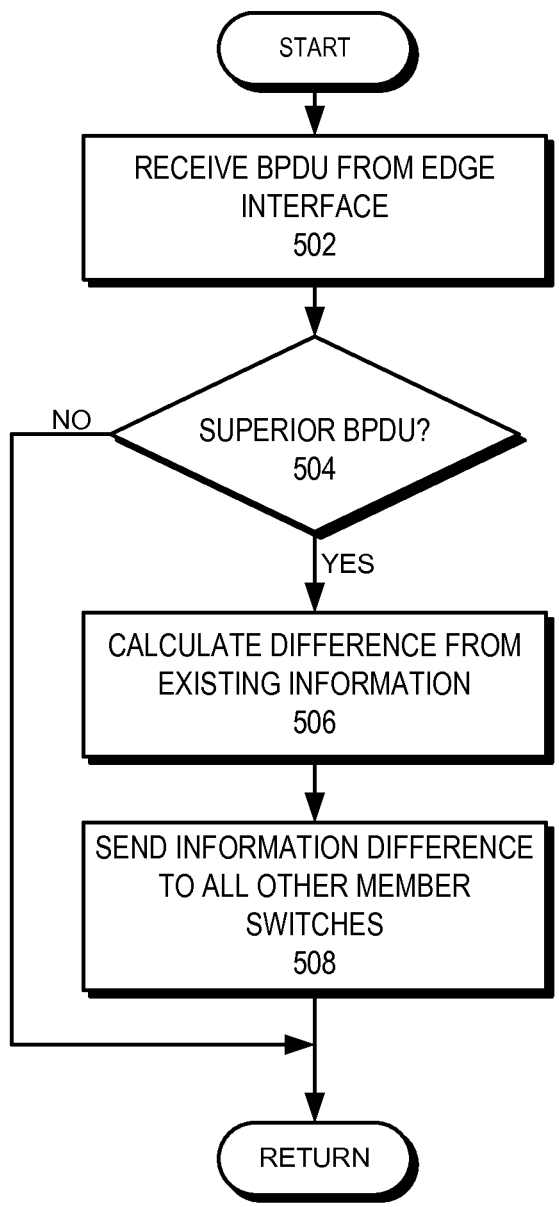
FIG. 5A presents a flowchart illustrating the process of a member switch of a fabric switch sharing STP information with other member switches, in accordance with an embodiment of the present invention.

The STP instance of a respective switch in a fabric switch is configured with the switch identifier of the fabric switch. The STP process of the instance treats an edge interface as a regular STP interface and an internal interface as a special logical interface, as described in conjunction with FIG. 2. If any member switch receives a superior BPDU from an edge interface, the switch updates the local STP database and sends the information to all other member switches of the fabric switch. In some embodiments, the STP process uses the fabric mechanism of the fabric switch to reliably deliver the superior information. FIG. 5A presents a flowchart illustrating the process of a member switch of a fabric switch sharing STP information with other member switches, in accordance with an embodiment of the present invention.

The switch receives a BPDU from an edge interface (operation 502) and checks whether the received BPDU is a superior BPDU (operation 504). A superior BPDU contains a superior root switch information, such as a lower path cost. If the BPDU is superior, the switch calculates the difference between the information in the received BPDU and the corresponding information in the local STP database (operation 506). If the BPDU is new, the difference is the full BPDU. Operation 506 reduces traffic load in the internal links of a fabric switch. The switch then sends the difference in information to all other member switches (operation 508). In some embodiments, the switch uses the fabric mechanism of the fabric switch to reliably deliver the information.

Figure 5B:
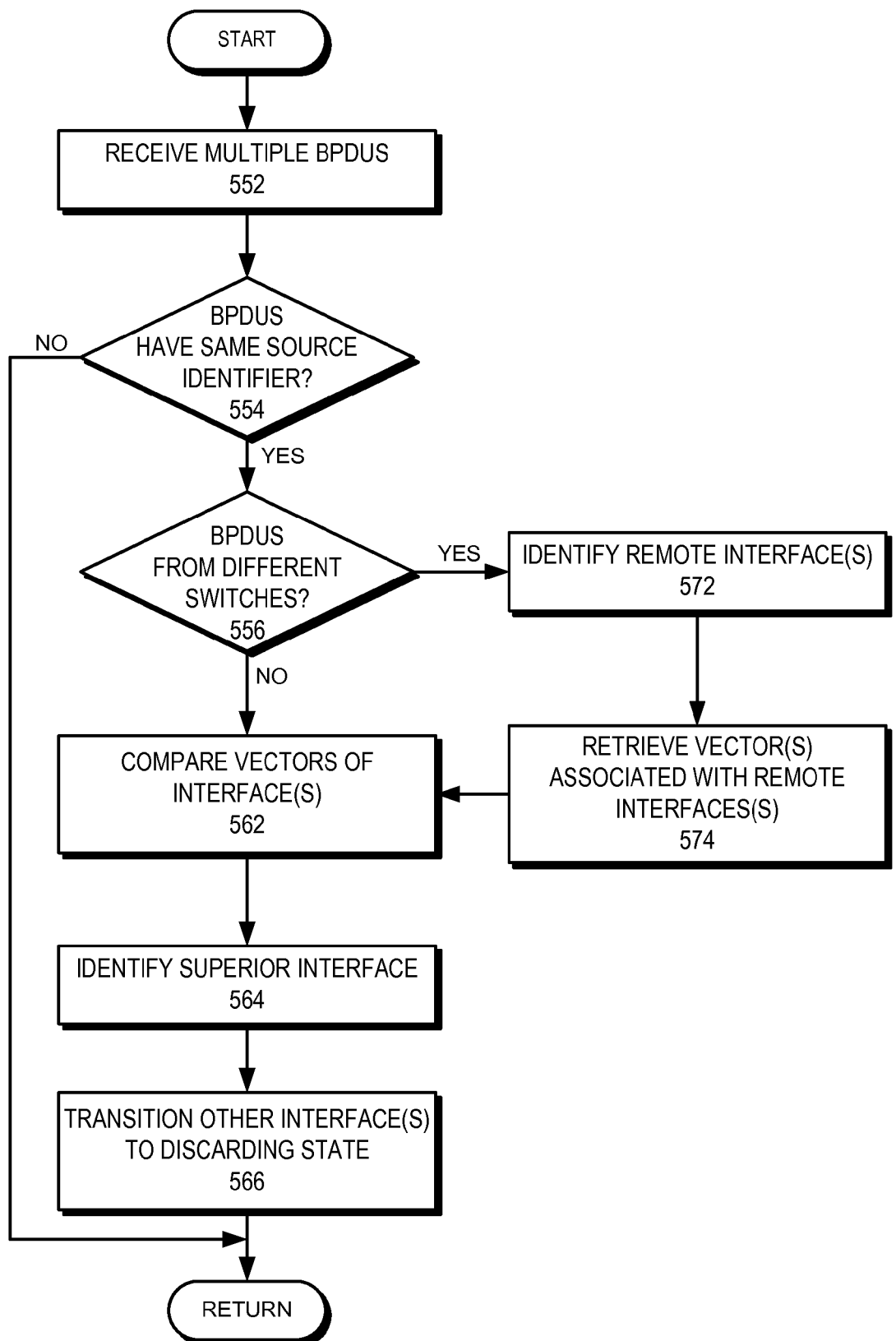
FIG. 5B presents a flowchart illustrating the process of a fabric switch detecting and breaking a loop using STP, in accordance with an embodiment of the present invention.

Because member switches share BPDU information, a member switch can receive multiple BPDUs from edge and internal interfaces. The switch then chooses the superior interface for forwarding and transitions the other interface to a discarding state. FIG. 5B presents a flowchart illustrating the process of a fabric switch detecting and breaking a loop using STP, in accordance with an embodiment of the present invention. Upon receiving multiple BPDUs (operation 552), the switch checks whether the BPDUs have the same source switch identifier (operation 554). Because all member switches in a fabric switch share the same switch identifier, these BPDUs can be received via different member switches. If the BPDUs have the same source identifier, the switch checks whether the BPDUs are from different member switches of the same fabric switches (operation 556). If they are from different switches, the switch identifies the remote interface(s) from which the BPDU(s) have been received (operation 572). A respective interface in a fabric switch has a unique identifier for the fabric switch. The identifier can include an identifier to the member switch in which the interface physically resides. The switch then retrieves STP vector(s) of the corresponding remote interface(s) (operation 574). The vector can contain the source and the destination switch and interface identifiers.

If the BPDUs are from the same switch (operation 556) or the switch has retrieved the vector(s) of the remote interface(s) (operation 574), the switch compares the vectors of the interface(s) (operation 562). Based on the comparison, the switch identifies the superior interface (operation 564). In some embodiments, the switch selects the interface with lowest identifier value as the superior interface. The switch then transitions all other interface(s) to the discarding state (operation 566). In some embodiments, the switch executes the process described in conjunction with FIG. 5B for a respective virtual local area network (VLAN). In other words, the switch can maintain a separate STP instance for a respective VLAN. As a result, the STP states are effective only for that specific VLAN. To reduce the number of STP instances, the switch can consolidate multiple VLANs with the same topology into a group and run an STP instance for the consolidated group.

RSTP Synchronization

RSTP has similar implementation as STP with rapid convergence and more information updated. When an edge interface of a member switch receives a proposal (i.e., a BPDU with a set proposal bit) for interface designation, the RSTP synchronization process updates all member switches in a fabric switch. Upon receiving the update, other member switches ensure their own edge interfaces are synchronized and send the synchronization information to the switch. An interface is synchronized when the role the interface is set. When the member switch receives the synchronizations from all switches in the fabric switch, the switch replies with an agreement (i.e., a BPDU with a set agreement bit) to the proposal.

Figure 6A:
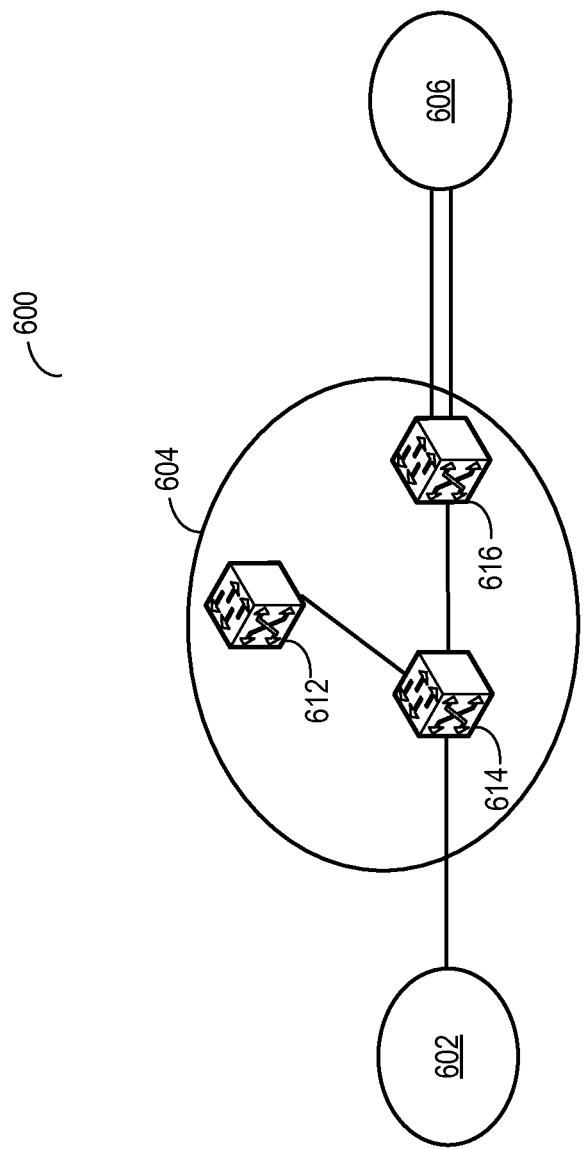
FIG. 6A illustrates exemplary internal and external connectivity of a fabric switch, in accordance with an embodiment of the present invention.

FIG. 6A illustrates exemplary internal and external connectivity of a fabric switch, in accordance with an embodiment of the present invention. In this example, switches 602, 604, and 606 are coupled to each other in a layer-2 network 600. Switch 604 is a fabric switch with member switches 612, 614, and 616. Switches 602 and 606 can be fabric or standalone switches. During operation, switch 602 is elected as the root switch. When an edge interface of switch 614 receives a proposal for interface designation from switch 602, the RSTP synchronization process of switch 604 updates member switches 612 and 616. Upon receiving the update, switches 612 and 616 ensure their own edge interfaces are synchronized. For example, switch 616 ensures the interfaces to switch 606 are synchronized. After the synchronization, switches 612 and 616 send the synchronization information to switch 614. When switch 614 receives the synchronizations information from all member switches in fabric switch 604, switch 614 replies with an agreement to switch 602.

Figure 6B:
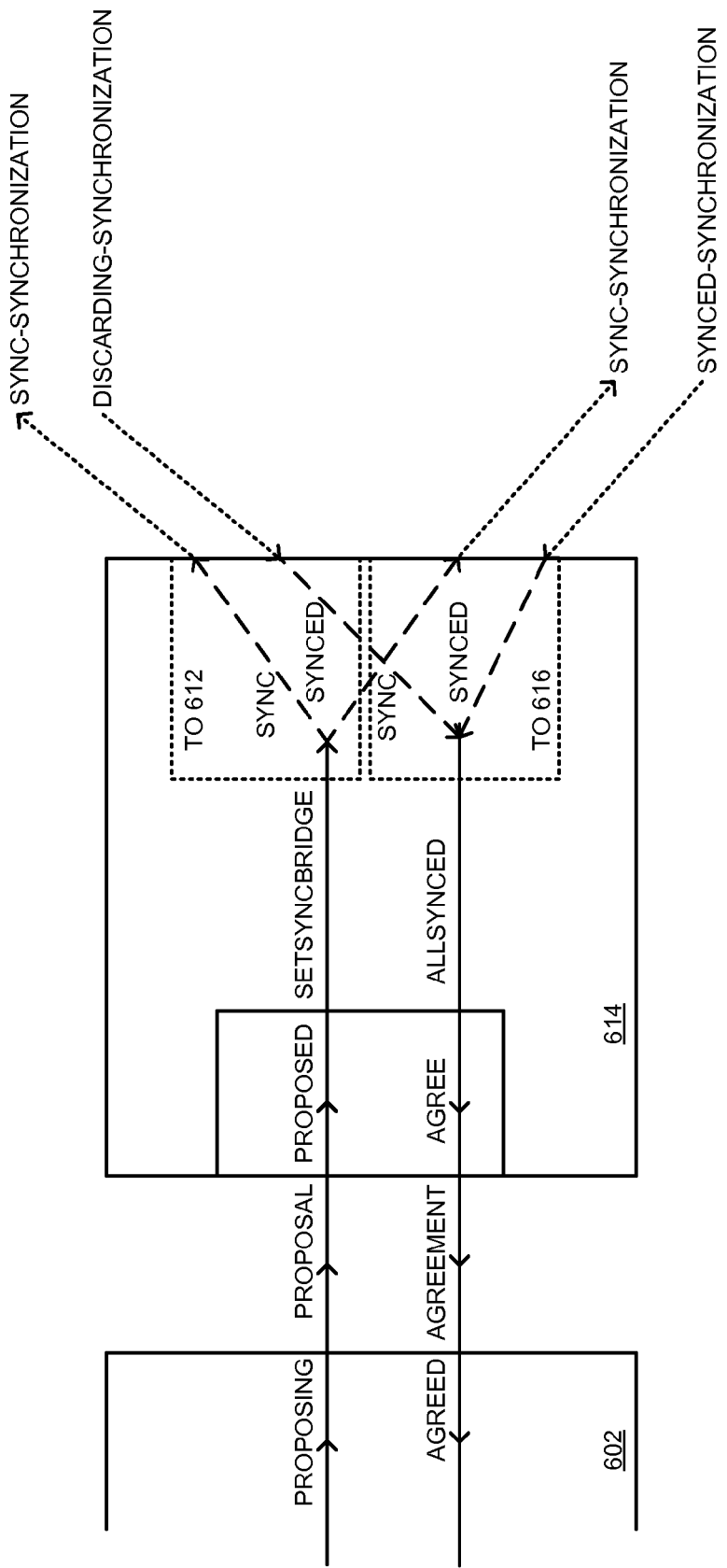
FIG. 6B illustrates a first exemplary distributed Rapid Spanning Tree Protocol (RSTP) synchronization in a fabric switch, in accordance with an embodiment of the present invention.

FIG. 6B illustrates a first exemplary distributed RSTP synchronization in a fabric switch, in accordance with an embodiment of the present invention. All components in FIG. 6B are the same as in FIG. 6A, so the same numerals are used to denote them. During operation, switch 602 moves to "proposing" state and sends a proposal to fabric switch 604 via switch 614. Upon receiving the proposal, switch 614 moves to "proposed" state. At the same time, to facilitate synchronization with all other member switches, switch 614 moves to a "setsyncbridge" state which indicates that switch 614 is waiting for synchronization with other member switches. Switch 614 then transitions the logical interfaces coupling switches 612 and 616 to a "sync" state and sends "syncsynchronization" message to switches 612 and 616 instructing these switches to synchronize their local interfaces.

Because switch 612 does not have any end devices coupled to it, switch 612 can be in a discarding state. Switch 612 responds with a "discarding-synchronization" message back to switch 614. On the other hand, switch 616 synchronizes its local interfaces coupled to switch 606 and responds with a "synced-synchronization" message back to switch 614. The synchronization between switches 616 and 606 is further discussed in conjunction with FIG. 6C. Upon receiving all responses, switch 614 marks the receiving interfaces as "synced" and transitions to "allsynced" state indicating that switch 614 has synchronized all local interfaces. As a result, switch 614 moves to the "agree" state and sends an agreement to the proposal. Upon receiving the agreement, switch 602 moves to an "agreed" state.

Figure 6C:
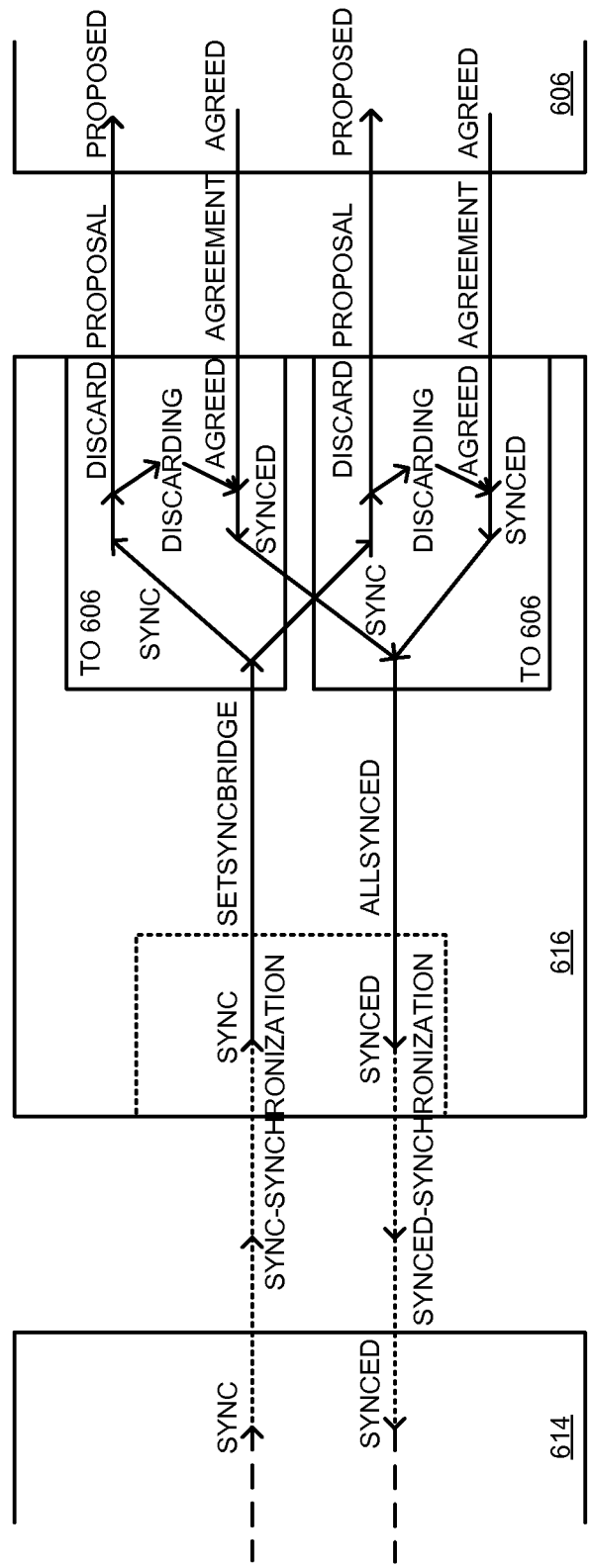
FIG. 6C illustrates a second exemplary distributed RSTP synchronization in a fabric switch, in accordance with an embodiment of the present invention.

FIG. 6C illustrates a second exemplary distributed RSTP synchronization in a fabric switch, in accordance with an embodiment of the present invention. All components in FIG. 6C are the same as in FIG. 6B, so the same numerals are used to denote them. During operation, upon receiving "sync-synchronization" message from switch 614, switch 616 transitions the receiving interface to "sync" state and transitions to a "setsyncbridge" state. Switch 616 then puts the interfaces coupling switch 606 to a "discard" state and sends proposal message to switch 606 via both interfaces. Upon receiving the proposal, switch 606 selects the superior interface and sends agreement message accordingly.

Upon receiving the agreement, the receiving interface moves to "agreed" state. Switch 616 marks the receiving interfaces as "synced" and moves to "allsynced" state indicating that switch 616 has synchronized all local interfaces. As a result, switch 616 marks the logical interface between switches 616 and 614 as "synced" and sends a "synced-synchronization" message to switch 614. Upon receiving the message, switch 614 marks the receiving interface as "synced," as described in conjunction with FIG. 6B.

Multiple STP (MSTP) Synchronization

Figure 7:
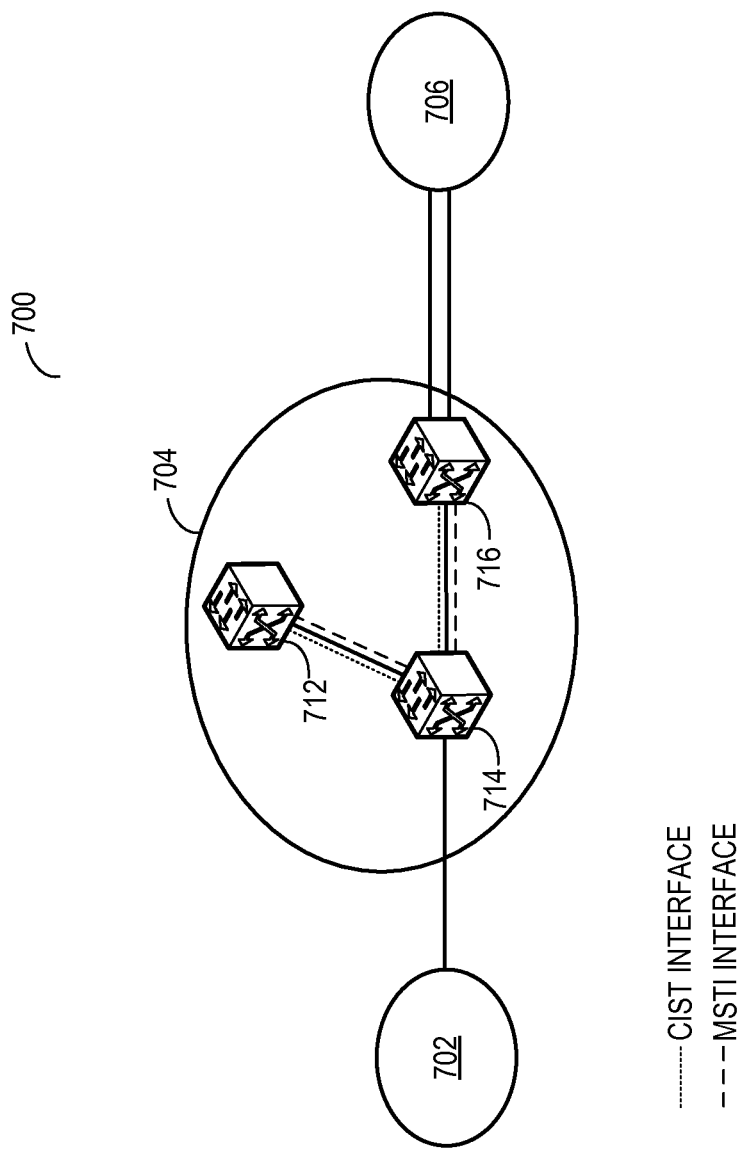
FIG. 7 illustrates exemplary Multiple Spanning Tree Protocol (MSTP) connectivity of a fabric switch, in accordance with an embodiment of the present invention.

FIG. 7 illustrates exemplary Multiple Spanning Tree Protocol (MSTP) connectivity of a fabric switch, in accordance with an embodiment of the present invention. In this example, switches 702, 704, and 706 are coupled to each other in a layer-2 network 700. Switch 704 is a fabric switch with member switches 712, 714, and 716. Switches 702 and 706 can be fabric or standalone switches. MSTP has similar implementation as RSTP, as described in conjunction with FIGS. 6A-6C. An MSTP implementation includes a Common and Internal Spanning Tree (CIST) and a plurality of Multiple Spanning Tree Instance (MSTI). A CIST is a spanning tree calculated through network 700 to ensure that all VLANs are simply and fully connected. A respective MSTP is calculated within a domain to provide a simply and fully connected topology for a respective VLAN.

Exemplary Switch System

Figure 8:
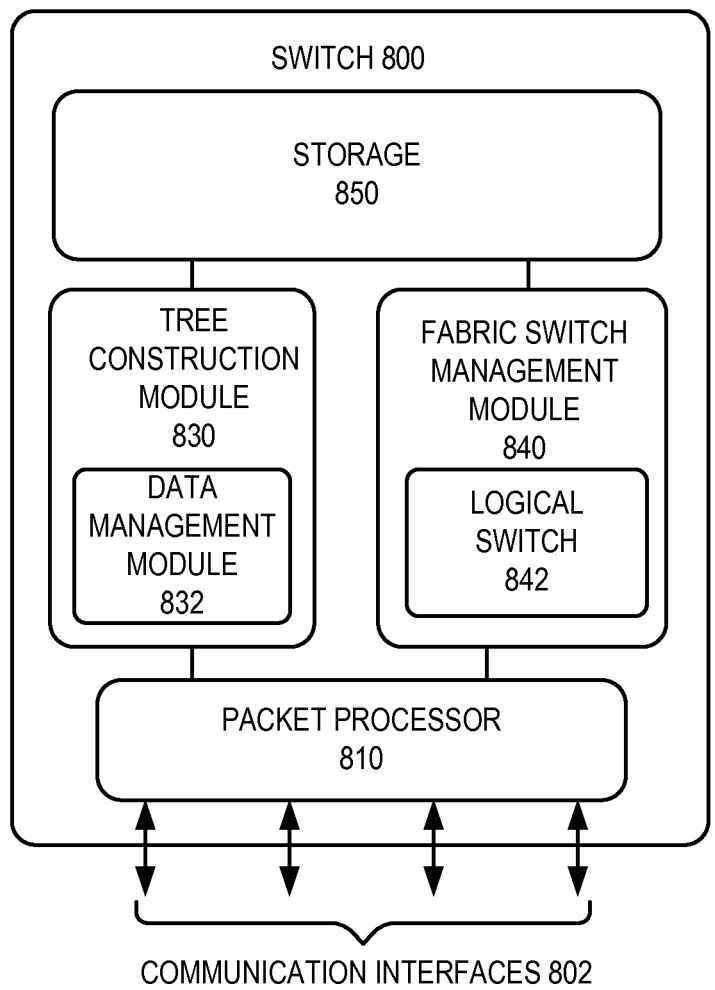
FIG. 8 illustrates an exemplary architecture of a switch, in accordance with an embodiment of the present invention.

FIG. 8 illustrates an exemplary switch, in accordance with an embodiment of the present invention. In this example, a switch 800 includes a number of communication interfaces 802, a tree construction module 830, a packet processor 810, and a storage 850. Tree construction module 830 includes a data management module 832. Packet processor 810 extracts and processes header information from the received frames.

In some embodiments, switch 800 may maintain a membership in a fabric switch, wherein switch 800 also includes a fabric switch management module 840 and a logical switch 842 representing the fabric switch. Fabric switch management module 840 maintains a configuration database in storage 850 that maintains the configuration state of every switch within the fabric switch. Fabric switch management module 840 maintains the state of logical switch 842, which is used to join other switches. In some embodiments, logical switch 842 can be configured to operate in conjunction with packet processor 810 as a logical Ethernet switch. Under such a scenario, communication interfaces 802 can include inter-switch communication channels for communication within a fabric switch. This inter-switch communication channel can be implemented via a regular communication port and based on any open or proprietary format. Communication interfaces 802 can include one or more TRILL interfaces capable of receiving frames encapsulated in a TRILL header. Packet processor 810 can process these frames.

During operation, communication interfaces 802 periodically send and receive frames containing spanning tree information. Packet processor 810 extracts spanning tree information associated with a remote switch from a received frame. Data management module 832 stores the extracted spanning tree information in a local database in storage 850. Tree construction module 830 assigns an interface state associated with a spanning tree to one or more of the communication interfaces 802 based on the extracted spanning tree information.

Note that the above-mentioned modules can be implemented in hardware as well as in software. In one embodiment, these modules can be embodied in computer-executable instructions stored in a memory which is coupled to one or more processors in switch 800. When executed, these instructions cause the processor(s) to perform the aforementioned functions.

In summary, embodiments of the present invention provide a switch, a method and a system for efficiently detecting a loop in a layer-2 fabric switch. In one embodiment, the switch includes a local database, a packet processor, a data management module, and a tree construction module. The packet processor extracts spanning tree information associated with a remote switch. The data management module stores the extracted spanning tree information in the local database. The tree construction module assigns an interface state associated with a spanning tree to a local interface based on the extracted spanning tree information.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a packet processor operable to extract spanning tree information associated with a remote switch;
   a data management module operable to store the extracted spanning tree information in a local database; and
   a tree construction module operable to
      assign an interface state associated with a spanning tree to a local interface based on the extracted spanning tree information; and
      preclude the local interface from forwarding frames based on the assigned interface state.

2. The switch of claim 1, wherein the spanning tree information is associated with one or more of the following protocols:
   Spanning Tree Protocol (STP);
   Rapid Spanning Tree Protocol (RSTP); and
   Multiple Spanning Tree Protocol (MSTP).

3. The switch of claim 1, wherein the packet processor is further operable to extract updated spanning tree information associated with the remote switch;
  wherein the data management module is further operable to determine difference between the spanning tree information in the local database and the updated spanning tree information; and
  wherein the packet processor is further operable to construct a frame containing the information difference for the remote switch.

4. The switch of claim 1, wherein the packet processor is further operable to extract spanning tree state synchronization information associated with the remote switch from a received frame; and
  wherein the tree construction module assigns the interface state based on the spanning tree state synchronization information.

5. The switch of claim 1, wherein the tree construction module is further operable to identify the local interface based on an interface identifier, wherein the interface identifier is unique in the switch and the remote switch.

6. The switch of claim 1, wherein the switch and the remote switch are members of an Ethernet fabric switch; and
  wherein the switch and the remote switch are associated with an identifier of the Ethernet fabric switch.

7. The switch of claim 1, wherein the tree construction module is further operable to assign the interface state on a per virtual local area network (VLAN) basis.

8. The switch of claim 7, wherein the tree construction module is further operable to consolidate interface states associated with a plurality of VLANs into a single interface state.

9. The switch of claim 1, wherein the packet processor is further operable to extract frames encapsulated in a Transparent Interconnection of Lots of Links (TRILL) header.

10. A computer-executable method, comprising:
  extracting, by a computing device, spanning tree information associated with a remote switch;
  storing the extracted spanning tree information in a local database;
  assigning an interface state associated with a spanning tree to a local interface based on the extracted spanning tree information; and
  precluding the local interface from forwarding frames based on the assigned interface state.

11. The method of claim 10, wherein the spanning tree information is associated with one or more of the following protocols:
  Spanning Tree Protocol (STP);
  Rapid Spanning Tree Protocol (RSTP); and
  Multiple Spanning Tree Protocol (MSTP).

12. The method of claim 10, further comprising:
  extracting updated spanning tree information associated with the remote switch;
  determining difference between the spanning tree information in the local database and the updated spanning tree information; and
  constructing a frame containing the information difference for the remote switch.

13. The method of claim 10, further comprising:
  extracting spanning tree state synchronization information associated with the remote switch from a received frame; and
  assigning the interface state based on the spanning tree state synchronization information.

14. The method of claim 10, further comprising identifying the local interface based on an interface identifier, wherein the interface identifier is unique in the switch and the remote switch.

15. The method of claim 10, wherein the switch and the remote switch are members of an Ethernet fabric switch; and
  wherein the switch and the remote switch are associated with an identifier of the Ethernet fabric switch.

16. The method of claim 10, further comprising assigning the interface state on a per virtual local area network (VLAN) basis.

17. The method of claim 16, further comprising consolidating interface states associated with a plurality of VLANs into a single interface state.

18. The method of claim 16, further comprising extracting frames encapsulated in a Transparent Interconnection of Lots of Links (TRILL) header.

19. A computing system, comprising:
  a processor; and
  a non-transitory computer-readable storage medium storing instructions that when executed by the processor cause the computing system to perform a method for creating a spanning tree in a computer network, the method comprising:
    extracting spanning tree information associated with a remote computing system;
    storing the extracted spanning tree information in a local database;
    assigning an interface state associated with a spanning tree to a local interface based on the extracted spanning tree information; and
    precluding the local interface from forwarding frames based on the assigned interface state.

20. The switch of claim 19, wherein the computing system and the remote computing system are members of an Ethernet fabric switch; and
  wherein the computing system and the remote computing system are associated with an identifier of the Ethernet fabric switch.

21. A switch, comprising:
  a packet processor operable to extract spanning tree information associated with a remote switch;
  a data management module operable to store the extracted spanning tree information in a local database; and
  a tree construction module operable to
    assign an interface state associated with a spanning tree to a local interface based on the extracted spanning tree information; and
    identify the local interface based on an interface identifier, wherein the interface identifier is unique in the switch and the remote switch.

22. The switch of claim 21, wherein the packet processor is further configurable to extract updated spanning tree information associated with the remote switch;
  wherein the data management module is further configurable to determine difference between the spanning tree information in the local database and the updated spanning tree information; and
  wherein the packet processor is further configurable to construct a frame containing the information difference for the remote switch.

23. The switch of claim 21, wherein the packet processor is further configurable to extract spanning tree state synchronization information associated with the remote switch from a received frame; and wherein the tree construction module assigns the interface state based on the spanning tree state synchronization information.

24. A switch, comprising:
a packet processor operable to extract spanning tree information associated with a remote switch; and
a tree construction module operable to assign an interface state associated with a spanning tree to a local interface based on the extracted spanning tree information;
wherein the switch and the remote switch are members of an Ethernet fabric switch; and
wherein the switch and the remote switch are associated with an identifier of the Ethernet fabric switch.

25. A switch, comprising:
a packet processor operable to extract spanning tree information associated with a remote switch;
a tree construction module operable to
assign an interface state associated with a spanning tree to a local interface based on the extracted spanning tree information; and
assign the interface state on a per virtual local area network (VLAN) basis.

26. The switch of claim 25, wherein the tree construction module is further operable to consolidate interface states associated with a plurality of VLANs into a single interface state.

* * * * *